US007949769B2

(12) United States Patent
Ronneke

(10) Patent No.: US 7,949,769 B2
(45) Date of Patent: May 24, 2011

(54) ARRANGEMENTS AND METHODS RELATING TO SECURITY IN NETWORKS SUPPORTING COMMUNICATION OF PACKET DATA

(75) Inventor: Hans Ronneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1164 days.

(21) Appl. No.: 10/595,489

(22) PCT Filed: Oct. 24, 2003

(86) PCT No.: PCT/SE03/01658
§ 371 (c)(1),
(2), (4) Date: Jan. 16, 2007

(87) PCT Pub. No.: WO2005/041475
PCT Pub. Date: May 6, 2005

(65) Prior Publication Data
US 2007/0226780 A1 Sep. 27, 2007

(51) Int. Cl.
*G06F 15/16* (2006.01)
(52) U.S. Cl. ........ 709/229; 709/200; 709/201; 709/224; 709/225; 709/227; 709/228; 709/232
(58) Field of Classification Search .................. 709/224, 709/225, 229, 200, 201, 227, 228, 232
See application file for complete search history.

(56) References Cited

U.S. PATENT DOCUMENTS

| | | | |
|---|---|---|---|
| 6,240,091 B1 * | 5/2001 | Ginzboorg et al. | 370/401 |
| 6,636,491 B1 | 10/2003 | Kari | |
| 7,277,547 B1 * | 10/2007 | Delker et al. | 380/270 |
| 2002/0027984 A1 * | 3/2002 | Elo | 379/377 |
| 2002/0078385 A1 * | 6/2002 | Suzuki et al. | 713/201 |
| 2004/0047308 A1 | 3/2004 | Kavanagh | |
| 2004/0051664 A1 * | 3/2004 | Frank | 342/457 |
| 2006/0193289 A1 * | 8/2006 | Ronneke et al. | 370/329 |
| 2008/0019323 A1 * | 1/2008 | Backman et al. | 370/335 |
| 2008/0316980 A1 * | 12/2008 | Ahlen et al. | 370/338 |

FOREIGN PATENT DOCUMENTS

WO WO 0241592 5/2002

OTHER PUBLICATIONS

Vodafone. Change Request—Security Issue with Multiple PDP Contexts. Tdoc S02-032979. 3GPP TSG-SA2 Meeting #34, Brussels, Belgium, Aug. 18-22, 2003.
3GPP, $3^{rd}$ Generation Partnership Project; Technical Specification Group Services and System Aspects; General Packet Radio Service (GPRS); Service Description; Stage 2 (Release 6). 3GPP TS 23.060 v6.2.0 (Sep. 2003).

* cited by examiner

*Primary Examiner* — Liangche A Wang

(57) ABSTRACT

The present invention relates to a system nodes and a method for enhancing security of end user station access to Internet and intranet(s), e.g. of corporate access, over access network access points, with gateway packet data nodes and packet data support nodes. It further includes security indication providing means for providing an (corporate) access point with a security criterium indication (defining security) and for distributing said security indication to a packet data support node. A security enforcement mechanism is provided in the packet data support node, the security enforcement mechanism at least providing for preventing all other traffic not fulfilling the security criterium conflicting the security indicated access point when there is a connection requiring security over the security indicated access point, at least until the last packet of the security indicated access point connection has been sent.

22 Claims, 17 Drawing Sheets

ARRANGEMENTS AND METHODS RELATING TO SECURITY IN NETWORKS SUPPORTING COMMUNICATION OF PACKET DATA

FIELD OF THE INVENTION

The present invention relates to a system for enhancing security of end user station access to Internet and intranet, e.g. corporate access, over an access network with access points, which system comprises gateway packet data nodes and packet data support nodes. The invention also relates to a packet data support node for enhancing security at end user station access to Internet and intranets, e.g. so called corporate access. Still further the invention relates to a node in a mobile communications system supporting communication of packet data comprising security indicating means for providing access points with a security indication to allow for secure remote access connections to corporate networks. Still further the invention relates to a method for enhancing security for end user station access to Internet and intranets, e.g. so called corporate access.

STATE OF THE ART

In the global communications society of today, in which end users often move from one place to another but still need to be able to access Internet as well as one or more intranets, e.g. the company intranet, there is a need for, particularly on behalf of companies but for commercial reasons also for operators of communication systems, to be able to offer means for enabling remote access to corporate networks. This can be done in different manners, for example over GPRS, WLAN etc. However, for the provision of access to an intranet it is of utmost importance, a precondition, for making the service successful, that security can be upheld and guaranteed since the security aspect in such cases generally is very high and exceedingly important.

For corporate access using GPRS, for example, a serious security loophole has been identified. This relates to the case when multiple Primary PDP Contexts are active. This may, actually have as an effect that the loophole makes the user station or user equipment (IE) act as a router for packets between the connections created by the different PDP contexts. Among others there has been a suggestion (by Vodafone, cf. S2-032979, CR (Change Request) 434 on 3GPP 23.060, Brussels 18-22 Aug. 2003) in order to reduce the impact of such a loophole, by removing the ability to have connections to public access and certain private APNs (Access Point Names) simultaneously. A similar security issue relating to a user equipment having multiple concurrent Primary PDP Contexts active is also relevant for situations wherein multiple connections are possible, among others including circuit switched connections, packet switched connections, WLAN connections etc. The risk for abusive access comes from unauthorized third parties hacking or manipulating a user terminal in order to be able to access another network, particularly an internal company network or an intranet. For GPRS services, the issue is to some extent handled in 3GPP TS 23.060, stating that the use of radio communications for transmission to/from subscribers in mobile networks makes them particularly sensitive to misuse of the resourses by unauthorized persons using manipulated user stations (UEs). In order to protect the system, access control can be implemented, i.e. the network can support restrictions on access by or to different GPRS subscribers, such as restrictions by location, screening lists, and so on. However, so far there is no satisfactory mechanism to provide for such protection, not to speak from even better protection.

The solution referred to above has to somehow be enforced in for example a packet data support node such as SGSN, but still there is no satisfactory solution as to how such an enforcement should be achieved.

It has been suggested that certain APNs, such as corporate APNs, be security marked, i.e. that the APN is subject to a raised security level. This could be provided for by configuration of an APN restriction, it is hereby referred to the above mentioned document S2-032979, CR on 23.060 "Security Issue with Multiple PDP Contexts", in the GGSN.

An APN restriction as referred to above is then transferred to the (e.g.) SGSN where the security is to be enforced. The APN restriction needs to be configured in GGSN for example, and enforced in SGSN in order to function in a roaming case, as well as when subscribers of particular operator visit other networks operated by other operators. The transfer between SGSN and GGSN is suggested to be carried out through the addition of the parameters APN restriction and maximum APN restriction to be transferred in create PDP context requests and update PDP context requests. It should also be a feature to perform calculation/decision as to whether certain APN combinations are permissible in the PDP context activation and inter-SGSN Routing Area Update procedures.

However, a solution as suggested above only solves part of the problem. One example of a situation for the problem is not solved, is when a Laptop uses GPRS for corporate access. It may in principle at the same time have simultaneous connections to for example Internet using other links of access, for example fixed access or access over WLAN.

Suggestions have also been made relating to the use of firewalls/VPN clients in a user terminal in order to solve this problem. However, there is also a need for a network based solution to the problem and not only a terminal based solution, for example in order for operators to be able to claim that their network is secure. In addition thereto it is desirable to be able to provide for a secure remote corporate access, in a particular case over e.g. GPRS. The conclusion also must be that it is not sufficient to exclusively use terminal based security mechanisms but that network-based security mechanisms and terminal-based security mechanisms are complementary. Both contribute to provide a sufficient level of security to handle different security attacks. Network-based security mechanism provide for protection when an end user uses the wrong terminal type, has failed to setup, has misconfigured or does not want to use appropriate terminal-based security mechanisms. Terminal-based security mechanisms, on the other hand, protect from threats which network-based mechanisms are unable to detect. Network-based security solutions have the advantage that they are easier to combine with an operator service offerings. It gets possible to setup agreements between operator and for example an enterprise for, on the user end, put into effect of such network-based security mechanisms.

Thus, the problems with multiple PDP contexts and the risk that a user station, particularly a user equipment UE, be used as a router to get access from Internet to corporate intranets, needs to be solved. Generally a compromised or manipulated user equipment can not be trusted to perform necessary actions to satisfactorily safeguard the system. Even if firewalls are used, this may be insufficient, and e.g. if the firewall is located in an endpoints network and the network is accessed via a dedicated APN, a user station allocated a valid IP address for that APN will always be able to pass through the firewall. Attacks thus may appear to the firewall as entirely normal access actions. It is often also not practical to install firewall software in the user station for different reasons, e.g. limited processing power and multiple channel equipments connected to a single mobile terminal etc. Therefore it seems exceedingly important to find a network-based access control solution which provides a satisfactory degree of security and it is of course attractive both to operators of systems as well as to the end user or companies, for which it is exceedingly important that third parties can not access their networks.

SUMMARY OF THE INVENTION

What is needed is therefore a system as initially referred to through which a user can be provided with access to corporate networks, e.g. over GPRS etc. in a secure manner. A system is also needed through which an operator can provide a user with such access in an easy, reliable and secure manner. Particularly a system is needed which provides a network-based solution. Still further a system is needed allowing GPRS, or any 3GPP system (or WLAN) to provide remote corporate access in a secure and reliable manner. Particularly a system is needed through which it gets possible to control which, if any, connections to public access and private intranets can be provided simultaneously, i.e. through which it is possible to control which simultaneous connections that are acceptable while still providing for a satisfactory degree, or the desired degree, of security for a particularly corporate access, or for each individual access point connections.

It is particularly an object of the invention to suggest a system through which it gets possible to enforce a security mechanism through which one or more of the above mentioned objects can be achieved. Still further it is an object of the invention to provide a solution to the problem when several access point connections, e.g. when several PDP contexts, are active while still providing for the desired degree of security for each access point connection. It is a particular object of the invention to suggest a system through which the risk can be eliminated that a user station, e.g. a user equipment UE, acts as a router for packets between connections created by the PDP contexts, when there are several access points connections, or PDP contexts.

It is a particular object to provide a system through which the risk of abuse by a third party for getting access to a corporate network can be eliminated or avoided to the largest possible extent.

It is also a particular object of the invention to provide a system through which the problems associated with the enforcement at a security mechanism whilst a roaming situation, e.g. relating to a user changing networks, e.g. visiting other networks, can be solved.

It is a particular object of the invention to protect corporate networks when a user of for example a Laptop uses several access networks or several access techniques, e.g. access over GPRS, fixed access and access over a WLAN.

Further yet it is an object of the invention to provide a system through which reliable corporate access can be provided, particularly while also supporting mobility. It is also a particular object to provide a system through which secure corporate access can be provided in a manner which is as easy as possible, particularly without requiring extensive protocol changes.

A packet data support node for enhancing security of end user station access to Internet and intranet(s), e.g. corporate access, is also needed through which one or more of the above mentioned objects can be achieved. Still further a node in a mobile communication system supporting communication of packet data comprising security indicating means for providing access points with a security indication, to allow for secure remote access to corporate networks, is needed, through which one or more of the above mentioned objects can be met.

It is also an object of the invention to provide a method for enhancing security at end user station access to Internet and intranets, e.g. at corporate access, through which method one or more of the above mentioned objects can be achieved.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1A:
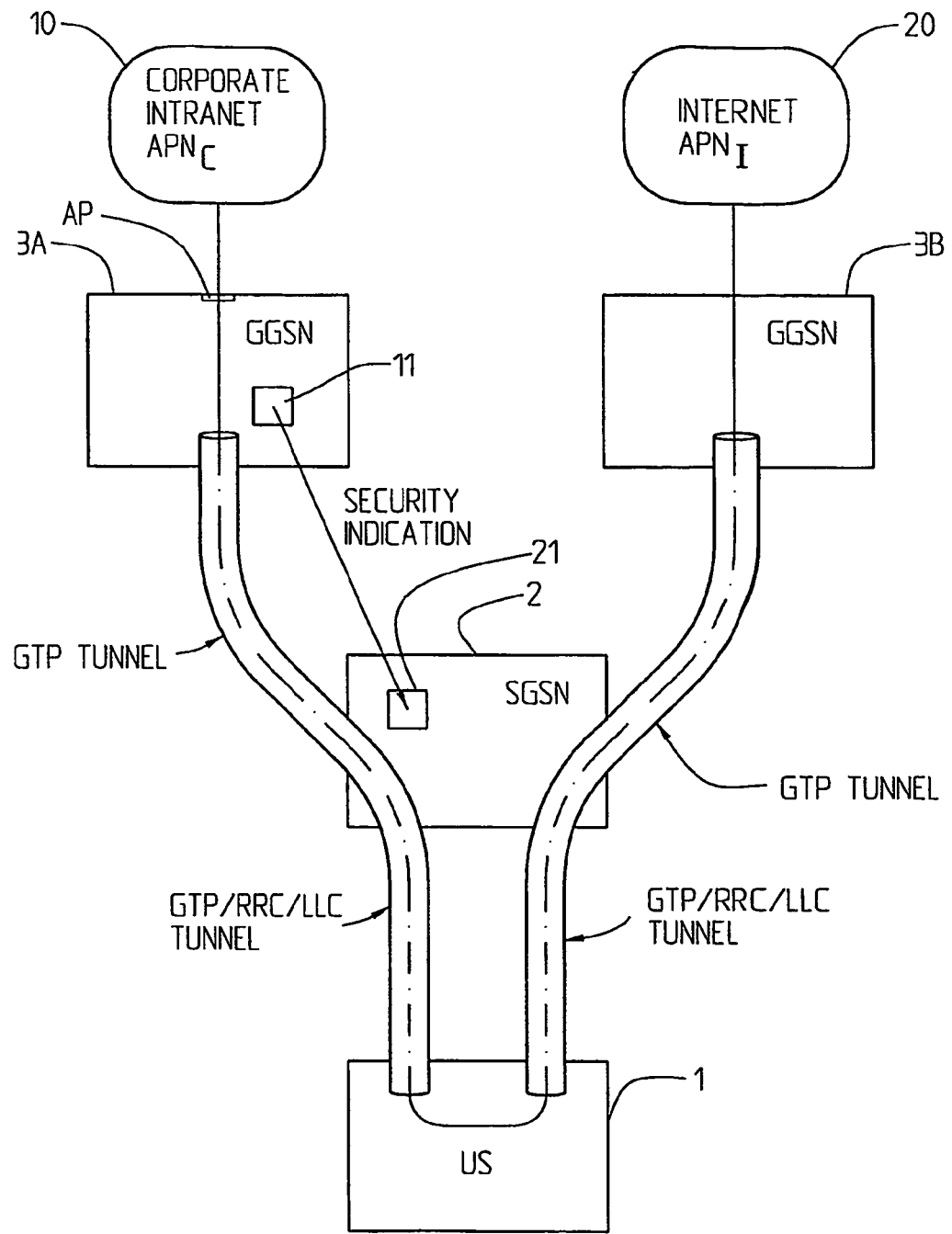
FIG. 1A shows a first implementation wherein security provisioning and distribution is performed in a GGSN node whereas enforcement is performed in SGSN.

FIG. 1 shows a first implementation of the inventive concept for providing secure remote access to a corporate network, corporate intranet 10 in this case. As can be seen access can also be provided to Internet 20, and unless the inventive concept is implemented, due to multiple PDP contexts a security loophole can be said to exist as discussed in the first part of the present application. The user station US 1, e.g. a user equipment UE, is connected to an SGSN 2 (in more general terms a packet data support node) which is in communication with a first GGSN (Gateway GPRS Support Node) 3A for corporate intranet access, and to another GGSN 3B for Internet access. It might however be one and the same GGSN. In this implementation the means for providing and distributing a security indication, 11, are provided in GGSN 3A with access point AP. The security indication provided in providing and distributing means 11 is provided to enforcement mechanism 21 in SGSN 2. As referred earlier in the application the security indication can be of many different kinds, for example it may simply comprise a flag, it may comprise an entire data structure or any thing therebetween, it may simply indicate that an access point connection over the access point AP, with Access Point Name $APN_C$, is, in this embodiment, security indicated to a SGSN 2 or rather to the enforcement mechanism 21 thereof. An access point connection is here supposed to comprise a PDP context. The security indication may comprise an attribute added to the PDP context. It may also include information about which other access point connections (types) that will be allowable simultaneously with said access point connection (if any). A number of different alternatives are possible. In one implementation the provisioning and distribution of security indications or security marks can be performed as described in the document referred to earlier in the application.

A secure PDP context, i.e. a PDP context incoming to a security indicated access point AP with $APN_C$ is tunneled between GGSN 3A, SGSN 2 and the user station 1. In one particular implementation a GTP (GPRS Tunneling Protocol) tunnel is used between GGSN 3A and SGSN 2, for WCDMA a GTP tunnel is also used between SGSN and a Radio Network Controller (RNC) (not shown in this figure) whereas a RRC (Radio Resource Control) tunnel is used between the RNC and the user equipment US 1. For the GSM case instead LLC (Link Layer Control) is used between SGSN and the user station 1. As a matter of fact, there is not one tunnel between GGSN and the user equipment, but a number of concatenated tunnels.

The enforcement procedure will be carried out in SGSN 2 and different ways of enforcing the security indication will be described below with reference to FIGS. 3, 4, 6A-9.

Particularly a security indication, e.g. a security attribute, is provided per APN (Access Point Name), which is a logical name referring to the external packet data network and/or to a service that the subscriber wants to connect to. The APN is composed of two parts, namely the APN network identifier, which defines to which external network the GGSN is connected, and optionally a request service requested by the user station. This part of the APN is mandatory. APN also comprises an APN operator identifier, which defines in which PLMN (Public Land Mobile Network) GPRS backbone the GGSN is located. The network identifier thus defines the connection part in GGSN (on the side of the Gi interface) whereas the operator identifier identifies which GGSN that is concerned. APN is formatted as a domain name which is translated to an IP address, at least the operator identifying part, with the use of a domain name server (DNS) which exists in all IP networks. The network identification part which is translated to a connection port on the Gi interface to the GGSN can also be said to, indirectly, correspond to a corporate intranet or a corporate access network.

Figure 1B:
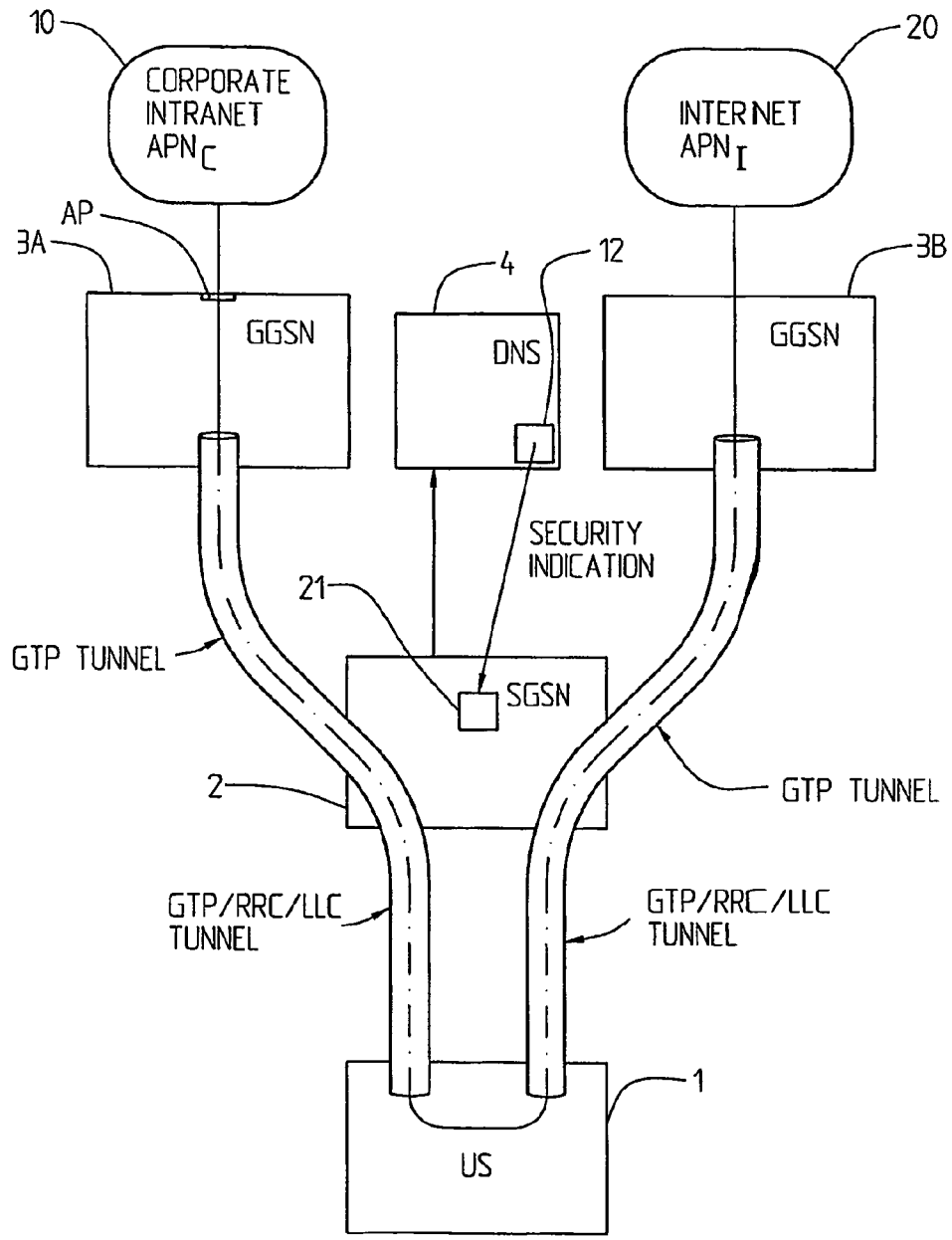
FIG. 1B shows a second implementation in which security indication provisioning and distribution is performed in a Domain Name Server (DNS), whereas enforcement is performed in a SGSN.

FIG. 1B is a figure similar to that of FIG. 1A, and similar reference numerals are used for corresponding components or nodes. However, in FIG. 1B the provisioning and distribution of security indications is provided in a domain name server DNS 4 comprising a corresponding means 12 which thus distribute the security indication to SGSN 2, or rather to the enforcement mechanism 21 provided therein.

In another embodiment where a modified DNS server is used it may be used in the following way:

The SGSN asks the DNS server to resolve the APN domain name. The DNS returns the IP address of the GGSN and a full security indication, as described above, to SGSN.

Also in this embodiment different enforcement mechanism can be implemented by enforcement means 21. For DNS based distribution of security marks, the APN resolution done when access point connections, e.g. PDP contexts, are activated, can be altered to either support a simple form of security indications or a complete form. The input to a DNS server 4 is always a domain name, and the normal (simple) output is always one or several IP addresses. For a complete form of security indications the DNS server needs to be modified or extended with a new type of records which can store the complete security indication.

According to one implementation DNS 4 is used as a centralized database for security indications, and it may, in one embodiment, be used in the following way: in DNS 4 the IP address for a security indicated access point, or a security indicated APN, is set to be an invalid, but by SGSN 2 known IP address, e.g. 0.0.0.0. When thus a security enabled SGSN 2 encounters this IP address, it knows that the access point, or here $APN_C$, is security indicated. In order to get the real IP address, the SGSN 2 then issues a new DNS request using a slightly modified APN such as the "secure" introduced into the original APN (for example companyxxxsecure.comcom.se@mnc001.mcc046.gprs).

The DNS is configured to translate this into the IP address to the GGSN 3A that should have been received in the first request or to an IP address and a complete security indication. A benefit with such an arrangement is that an SGSN that is not upgraded to support this security mechanism will never get (or "fetch") the IP address to GGSN. Hence the corporate access will not be possible to access if it is not safe. It is an advantage with DNS based security indication and distribution that this implementation, and other DNS based implementations, do not require any protocol changes. Mobility is supported when a user station moves from SGSN 2 to another SGSN by means of Inter SGSN Routing Area Update (IS-RAU), cf. FIG. 10 below.

In implementations in which GGSN is used for provisioning and distribution of security indications, the GTP protocol (and/or any other relevant protocols) need to be modified.

Figure 1C:
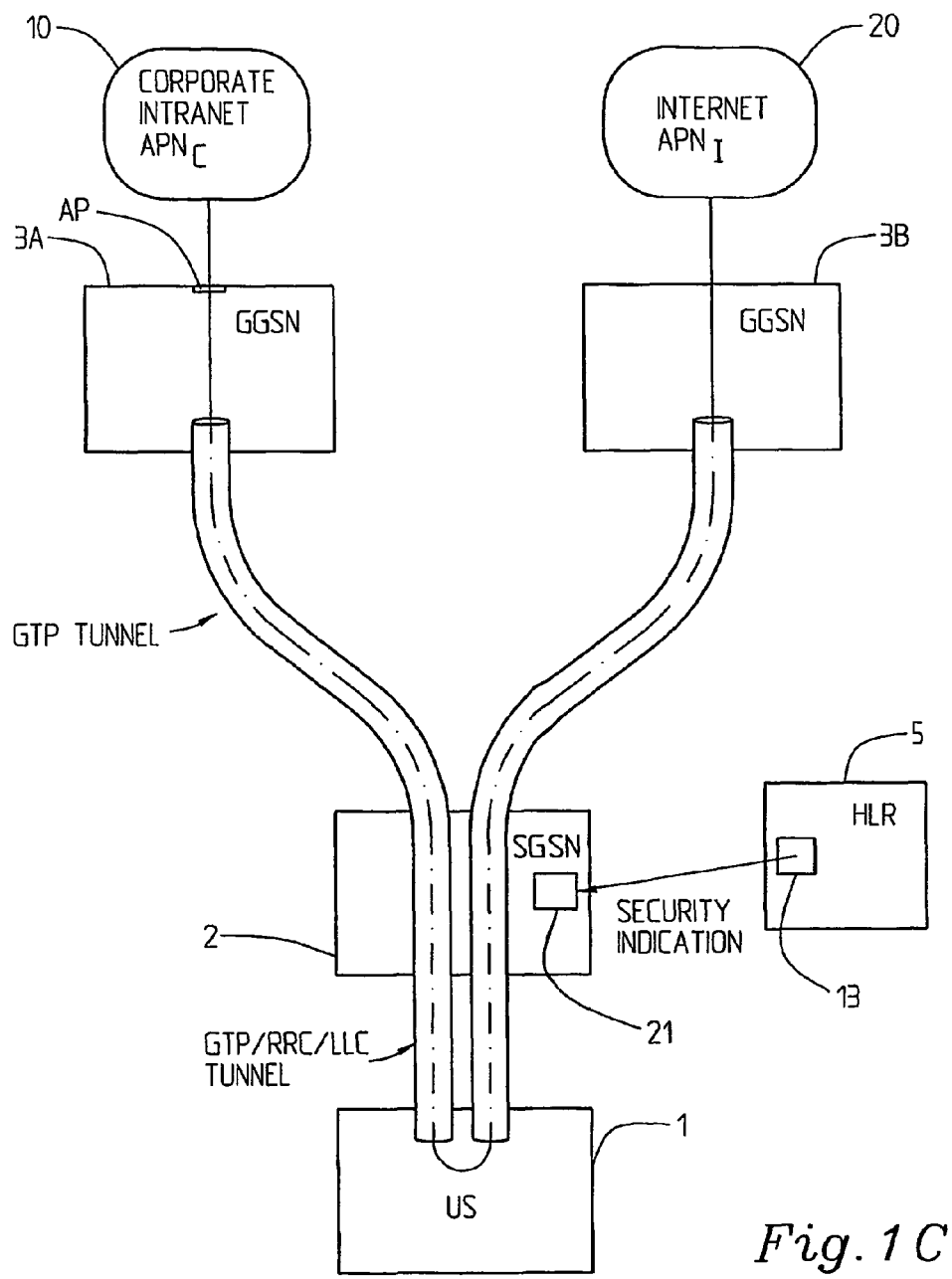
FIG. 1C shows a third implementation in which security indication provisioning and distribution is performed in a Home Location Register (HLR) whereas enforcement is performed in a SGSN.

FIG. 1C illustrates still another implementation for provisioning and distribution of security indications. Like reference numerals are used for corresponding elements or nodes as in FIGS. 1A, 1B. In this embodiment a Home Location Register HLR 5 comprises means 13 for provisioning and distribution of security indications, which thus are provided to enforcement mechanism 21 in SGSN 2. HLR based distribution of security indications comprises inclusion of the security indications (e.g. APN restrictions) together with the subscriber data from the HLR 5. When a subscriber (a subscriber of an enterprise for example using GPRS based corporate access) attaches to a GPRS/3G network, the security indication that is configured into the HLR will be sent to SGSN 2. This is done using the insert subscriber data message within the MAP protocol (Mobile Application Protocol) or with equivalent messages. Alternatively other protocols used to access the HLR or HSS, Home Subscriber Server, which is an extended HLR for new services such as IMS, IP Multimedia Subsystem, (for example Diameter or Radius protocols) could be used. Mobility will also here be supported since the security indication is forwarded to other SGSNs as a part of the ISRAU procedure. This is done using the SGSN context response message within the GTP (GPRS Tunneling Protocol) (cf. FIG. 10). It is an advantage of HLR based security indication provisioning and distribution that mobility will be supported and it is to a large extent in line with the current 3GPP architecture. However, protocol changes are required in MAP and GTP, and the HLR needs to be modified. Like in the implementations described with reference to FIGS. 1A and 1B, any enforcement mechanism as will be described below can be implemented.

Figure 2A:
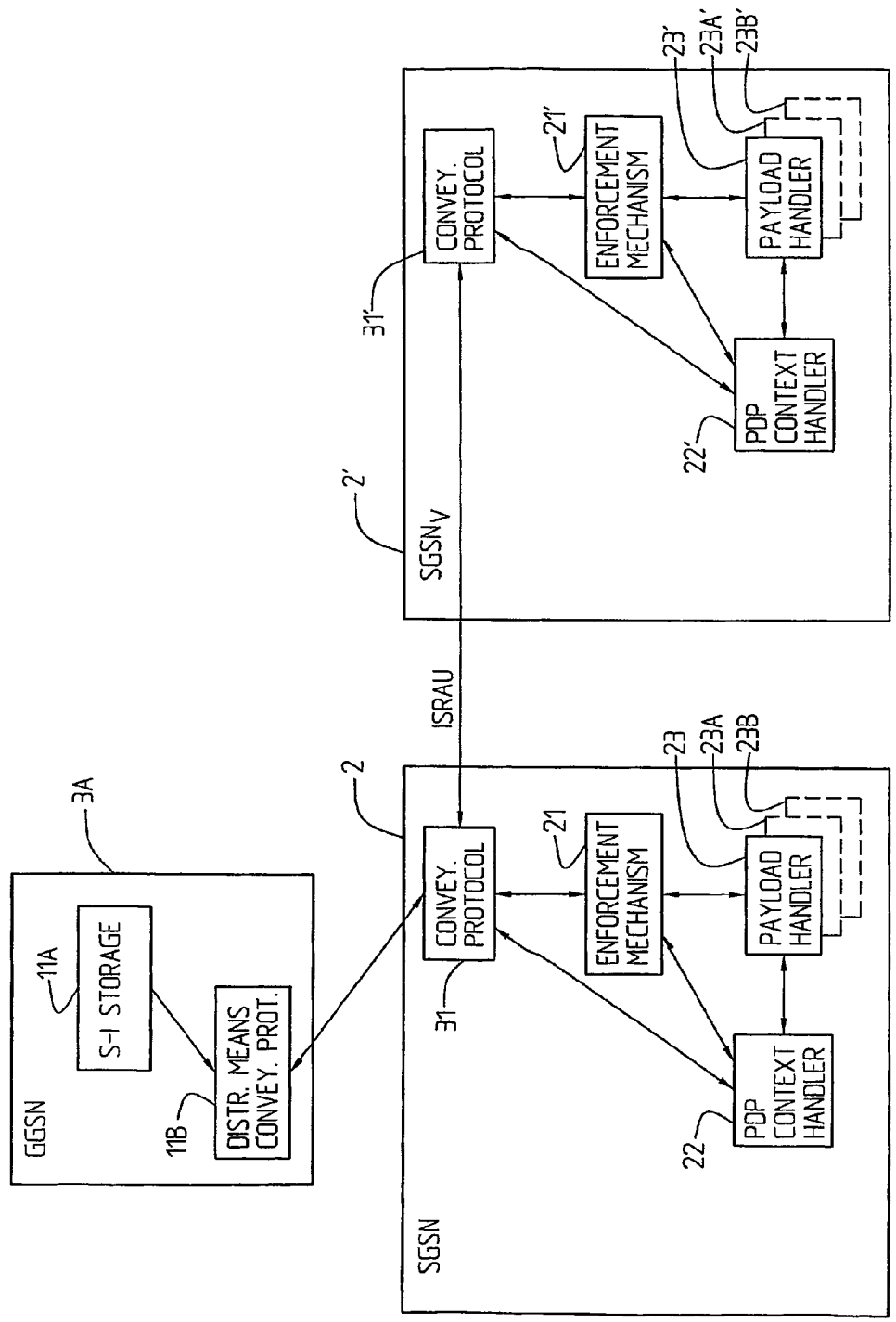
FIG. 2A illustrates in a more detailed manner the embodiment in which security indication provisioning and distribution is provided by a GGSN.

FIG. 2A is a block diagram describing an embodiment as schematically illustrated in FIG. 1A in which a GGSN 3A is used for provisioning and distribution of security indications. In this particular implementation is illustrated a GGSN 3A, an SGSN 2 and an $SGSN_V$ 2'. The second $SGSN_V$ 2' is only illustrated to show how mobility can be supported, i.e. when a user station moves from one SGSN to another SGSN, and it is of course not necessary for the functioning of the basic concept of the present invention.

Figure 2B:
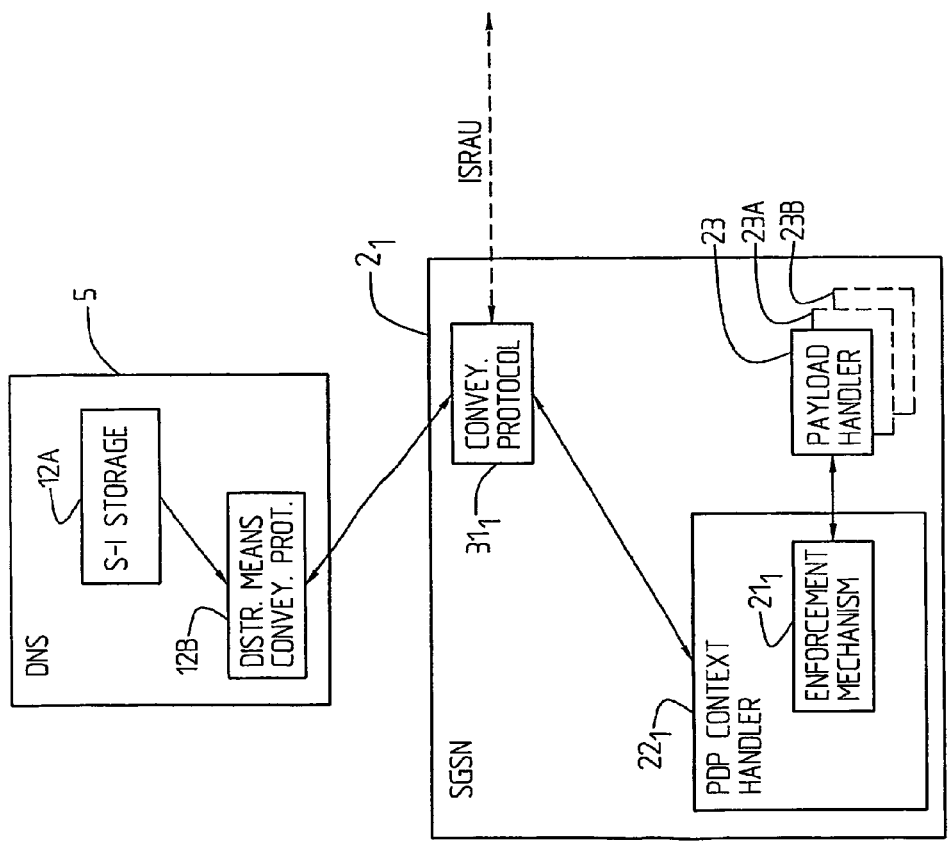
FIG. 2B illustrates in a more detailed manner an implementation in which security provisioning and distribution is provided by a DNS.

GGSN 3A here comprises security indicating (S-I) storage 11A for storing security indications, which is in communication with the distribution means 11B supporting a conveying protocol communicating with protocol handling means 31 of SGSN 2. SGSN 2 comprises an enforcement mechanism 21 which may support dynamic or static enforcement of the security protection. In this figure enforcement mechanism 21 is illustrated as external to the PDP context handler, 22, but it may as this well be included in the PDP context handler 22, as is illustrated in FIG. 2B which relates to an implementation in which a DNS is used for service provisioning and distribution. However, also when a GGSN 3A acts or handles the security provisioning and distribution, the enforcement mechanism may of course be included in the PDP context handler 22, thus reducing the number of messages sent internally within SGSN 2. SGSN 2 also comprises one or more payload handlers 23, 23A, 23B. Of course only those blocks and components which are of importance for the functioning of the inventive concept are illustrated in these figures for reasons of clarity. In these figures also are only illustrated that an enforcement mechanism is included, and they are silent as to whether it is static or dynamic. The security enforcement mechanism 21 controls operation of the PDP context handler 22 and of the payload handler 23 (23A, 23B) by controlling which GTP tunnels that are to be setup or taken down (static case) or provides information to the payload handler as to whether packets can be sent or not (dynamic enforcement) and end point establishment. Mobility is supported since all information relating to security indication in this security protection procedure can be transferred via the conveying protocol to another SGSN over Inter SGSN Routing Area Update (ISRAU). It is possible since the information is provided from an SGSN to another, and not from a GGSN, in which case mobility would not be supported. SGSN 2' to which a user moves acts in a similar way as SGSN 2.

FIG. 2B is a figure similar to that of FIG. 2A but for the case when the security provisioning and distribution is handled by a Domain Name Server DNS 4. Thus, in this case the DNS 4 comprises the security indication storage 12A and the distribution means 12B supporting a conveying protocol communicating with conveying protocol handling means of SGSN $2_1$. Also in this case mobility is supported by means of ISRAU to another SGSN, which however not is illustrated specifically in this figure but which works similar to the procedure described with reference to FIG. 2A. In the embodiment illustrated in FIG. 2B SGSN $2_1$ comprises one or more payload handlers 23, 23A, 23B and a PDP context handler $22_1$ but the enforcement mechanism $21_1$ is here included in the PDP context handler. Of course, if DNS based security protection is implemented, the enforcement mechanism could also be provided as a separate enforcement mechanism externally provided in relation to the PDP context handler $22_1$. An advantage with an implementation as described in FIG. 2B is that fewer messages are due to be sent within SGSN $2_1$. In other aspects the procedure is similar to that described above with reference to FIG. 2A.

Figure 2C:
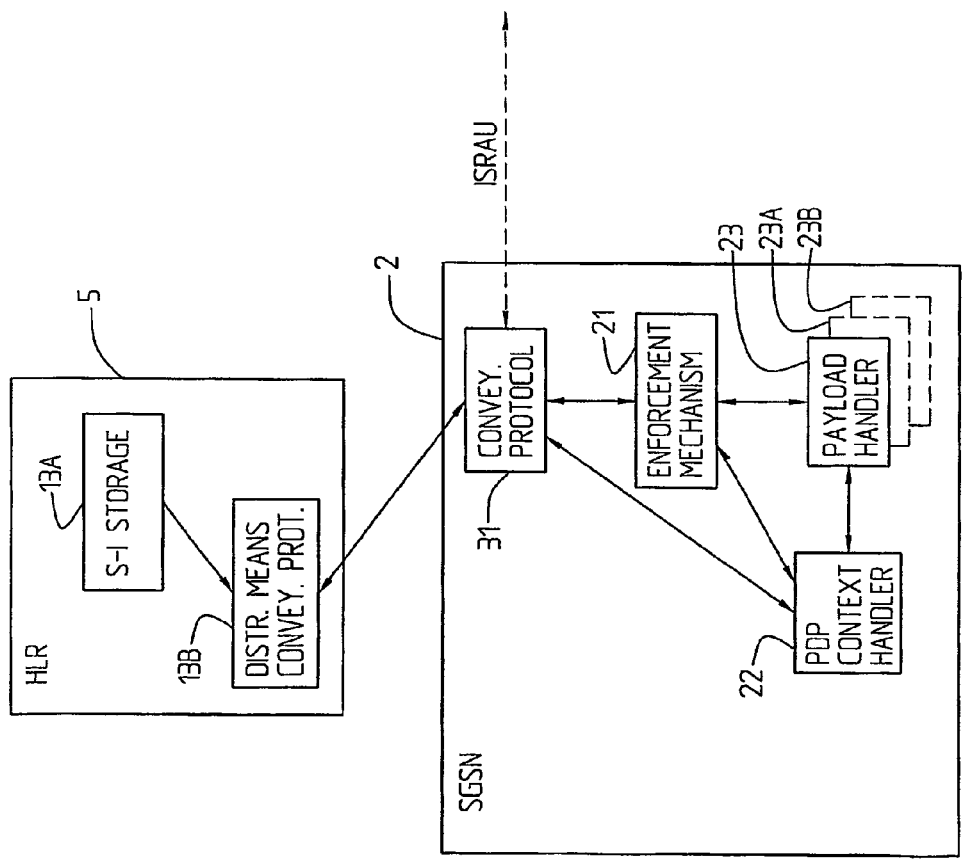
FIG. 2C illustrates in a more detailed manner an embodiment in which security indication provisioning and distribution is provided for by a HLR, FIG. 3 schematically illustrates a first implementation of enforcement based on a dynamic protection mechanism, FIG. 4 schematically illustrates a second implementation of enforcement based on a static protection mechanism.

FIG. 2C shows another embodiment which is based on the use of a HLR 5 for security indication provisioning and distribution, cf. FIG. 1C. Also in this case mobility is supported as described with reference to FIG. 2A. In this case however HLR 5 comprises a security indication storage 13A, distributing means 13B comprising a conveying protocol for communication with SGSN 2 over conveying protocol handling means 31. SGSN 2 comprises an enforcement mechanism 21, one or more payload handlers 23, 23A, 23B and a PDP context handler 22 as described in FIG. 2A. Of course the enforcement mechanism 21 might be included in the PDP context handler 22 as disclosed with reference to FIG. 2B. In other aspects the functioning is the similar to that described above. Static and dynamic enforcement respectively will be further described below with reference to sequence diagrams and flow diagrams.

Figure 3:
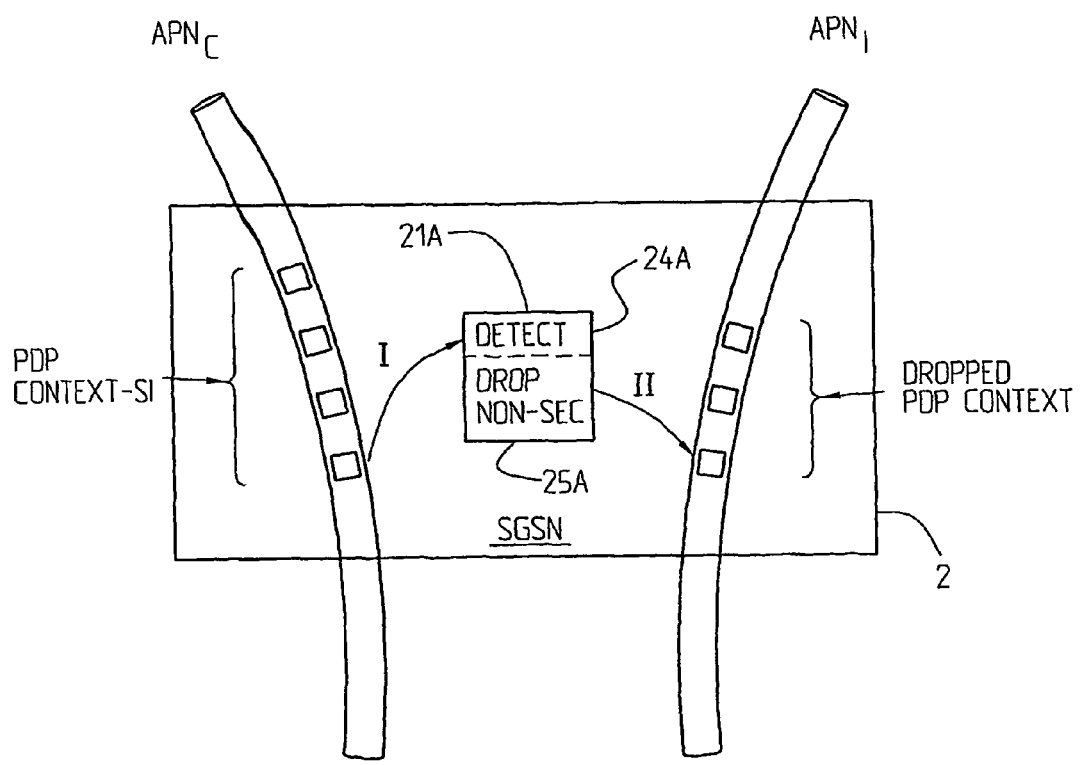

FIG. 3 schematically illustrates a first implementation of an enforcement mechanism as provided in SGSN 2. This embodiment relates to a dynamic security protection enforcement mechanism. The dynamic security protection is activated when traffic is sent on a PDP context to a security indicated access point. In FIG. 3 is illustrated a tunnel for $APN_C$, Corporate APN, and a tunnel for an Internet APN, $APN_I$. SGSN 2 comprises an enforcement mechanism 21A comprising a detecting means 24A and means for dropping non-security indicated access point connections 25A, particularly PDP contexts. Here it is supposed that traffic on a security indicated PDP context, I, is detected by detecting means 24A of the enforcement mechanism 21A. When there is traffic on the security indicated, or rather secure, PDP context, this will cause IP packets to be dropped on all PDP contexts that are not secure, or which are not security marked or which do not have the same security marking or a security marking meeting some criterium or criteria for allowing certain access point connections being active or trafficated simultaneously. A PDP context to an $APN_C$ can be said to be secure, or provided with a security indication if the access point or the APN is security indicated, if it is a PDP context income to said access point having that APN when there either are no other APNs active simultaneously or other security indicated APNs for which the criteria coincide with those of the first security indicated PDP context. Other non-secure or non-criteria coinciding access point connections will be dropped. The security indicated PDP context, or the PDP context(s) that are allowed to be sent simultaneously, remain(s) activated for some time which may be configurable by the operator after the last packet has been sent. Then traffic will be allowed on all PDP contexts again. In this case the packets of PDP context with $APN_I$ will be dropped until all the packets of PDP context—SI have been sent and when a given time interval has lapsed after sending of the last packet.

Figure 4:
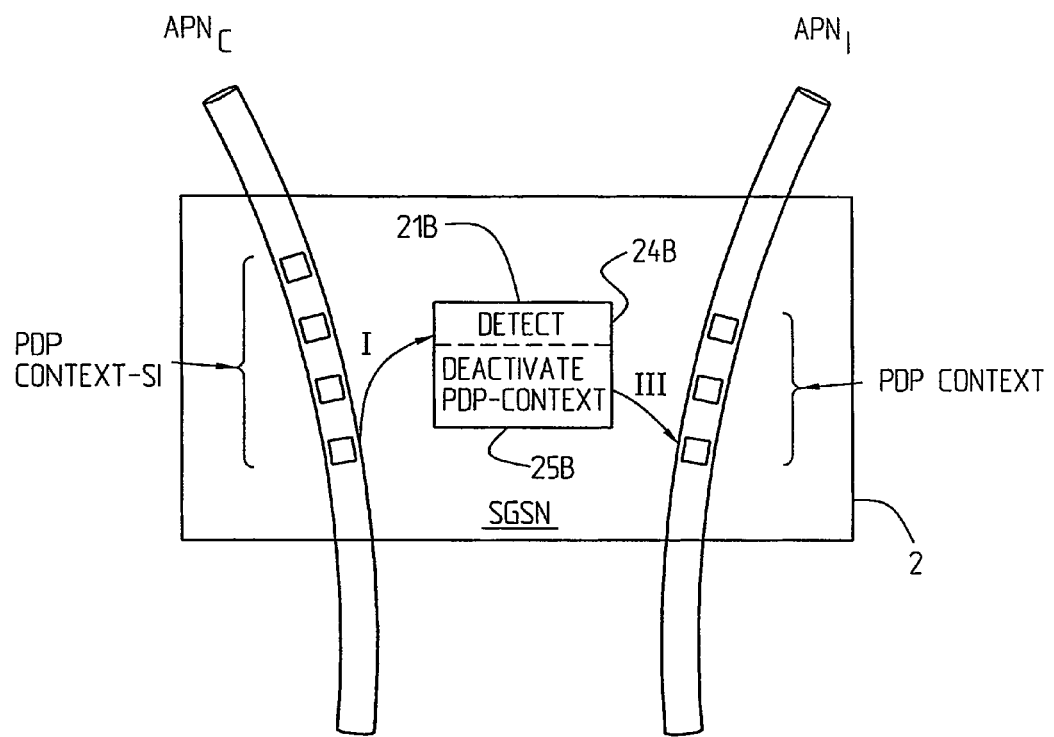

FIG. 4 is a schematical block diagram illustrating an SGSN 3 with an enforcement mechanism 21B comprising detecting means 24B and means for deactivating PDP contexts, 25B, i.e. not only dropping packets as in the case with a dynamic enforcement mechanism. In this embodiment a static enforcement mechanism is implemented. Static security protection is activated when traffic is sent on a security marked PDP context, i.e. when a first PDP context is incoming to a security indicated access point or with a security marked APN, $APN_C$. It may also be activated when a security marked PDP context is activated. Thus, when the detecting means 24B detects traffic on $APN_C$ (a so called security indicated PDP context), this will activate the PDP context deactivating means 25B such that all PDP contexts that are not security indicated or do not have the same or a security indication fulfilling some given criteria such as to be allowable concurrently with the first security indicated PDP context SI, these PDP contexts will be deactivated. Thus, as opposed to the preceding case with dynamic enforcement wherein the packets on non-secure PDP contexts only are dropped, here the PDP contexts are actually deactivated. This means that they have to be reactivated. Particularly lost PDP contexts are reactivated manually by the user. Activation of new PDP contexts, or lost PDP contexts, is blocked as long as the security protection is active, e.g. until all traffic on a secure PDP context has been exchanged.

Three different algorithms can be implemented in a static enforcement mechanism, involving control before activation, control directly after activation and control after activation when a first packet is detected to a security indicated access point, in other words a security marked PDP context. This will be further discussed with reference to flow diagrams 7, 8 and 9 respectively.

Figure 5A:
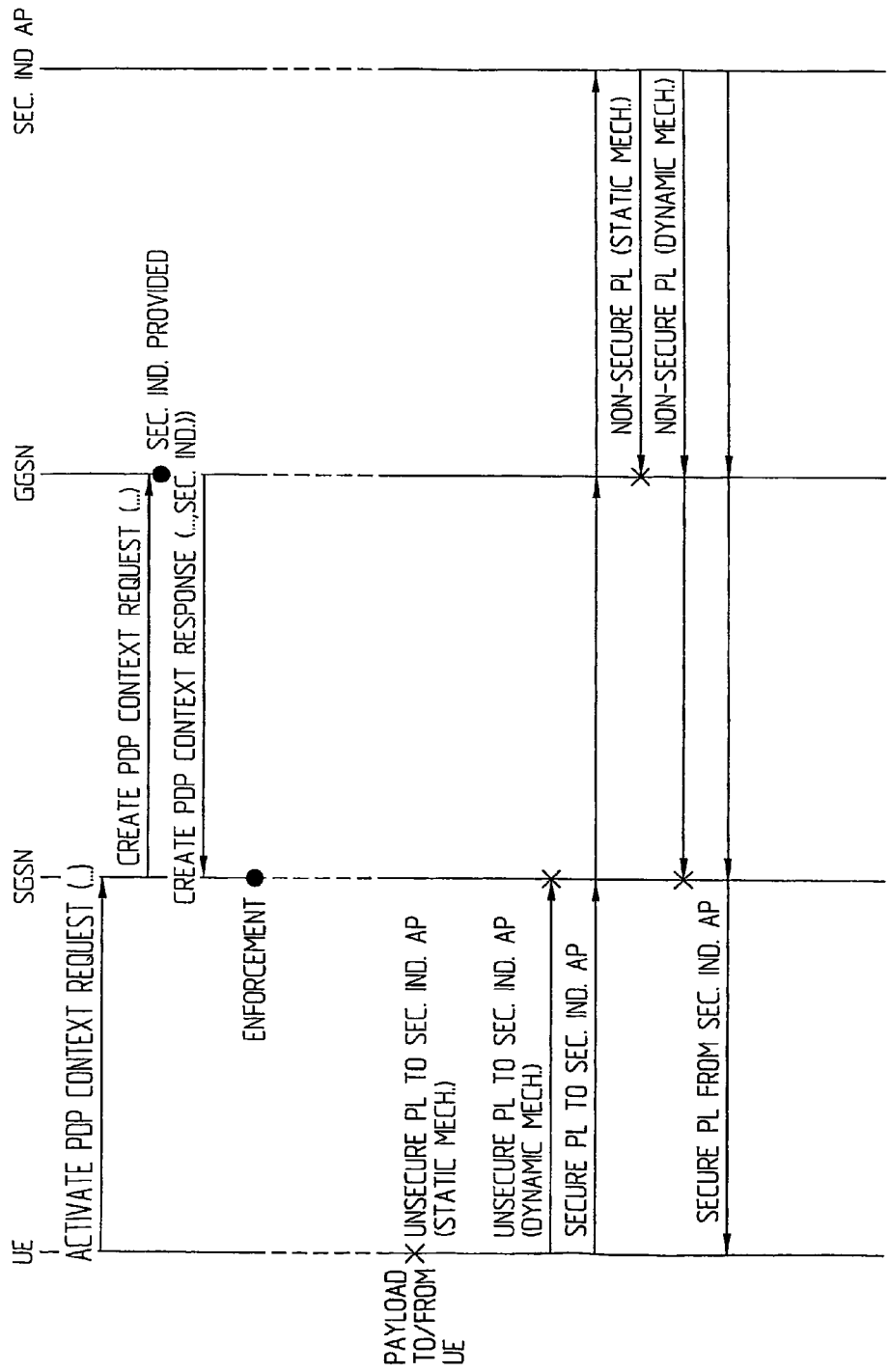
FIG. 5A is a sequence diagram illustrating the procedure when a GGSN is used for security indication provisioning and distribution.
Figure 5B:
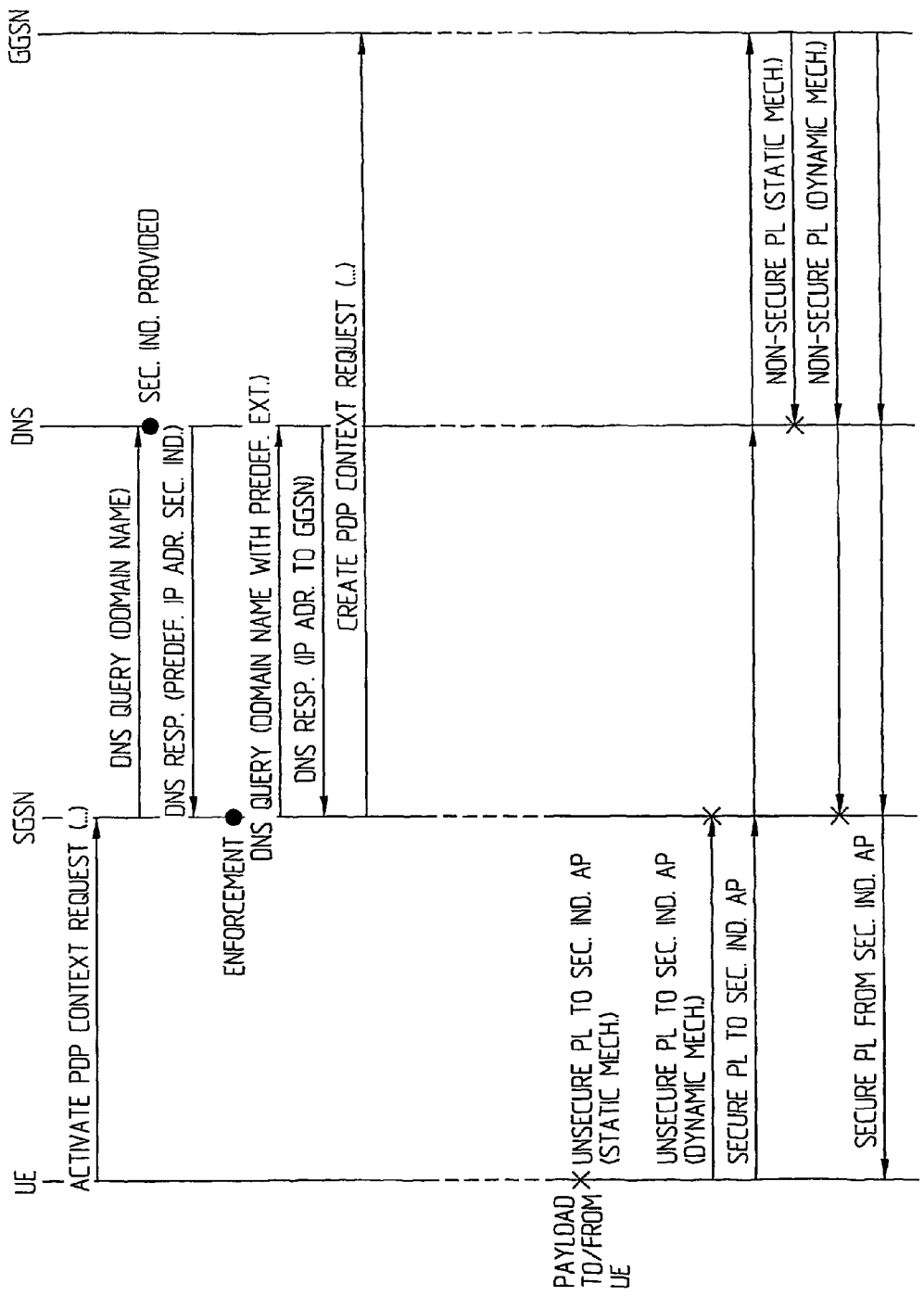
FIG. 5B is a sequence diagram illustrating the procedure when a DNS is used for security indication provisioning and distribution.
Figure 5C:
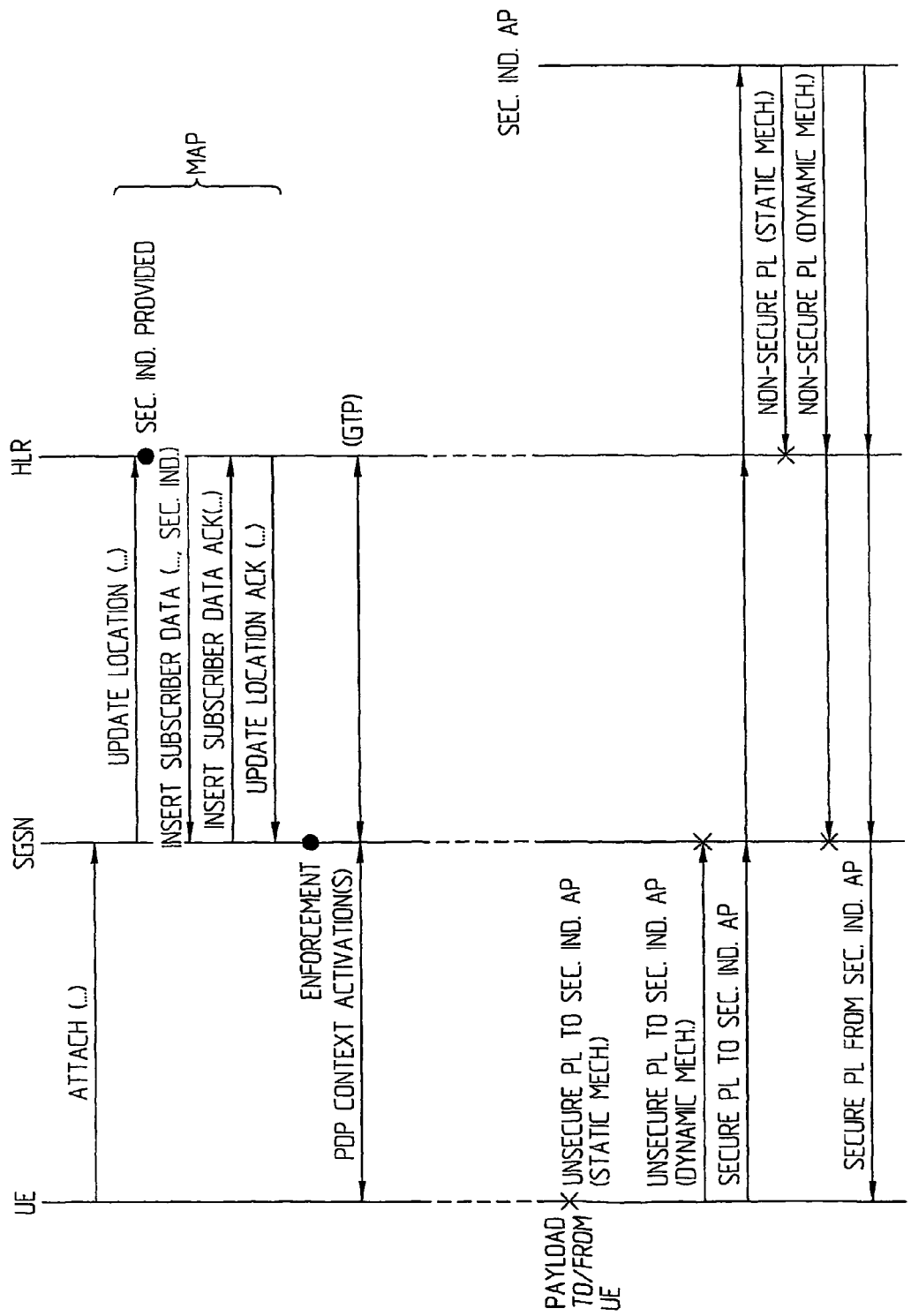
FIG. 5C is a sequence diagram as in FIGS. 5A, 5B wherein a HLR handles provisioning and distribution of security indications.

FIG. 5A is a sequence diagram illustrating the inventive concept in the case of GGSN based provisioning and distribution of security indications. The sequence starts with the user equipment UE sending an activate PDP context request to SGSN. It should be clear that only messages of importance for the functioning of the inventive concept are illustrated in FIGS. 5A-5C. Thus, at reception of the PDP context request from UE, SGSN sends a create PDP context request to GGSN. In GGSN, which here is supposed to handle security indication provisioning, a security indication is added to the create PDP context response which is sent to SGSN. In SGSN enforcement takes place as discussed above, and more thoroughly with reference to the flow diagrams of FIG. 6-9 describing different ways to implement the enforcement. GTP tunnels are used between SGSN and GGSN, and due to the introduction of the security indication in the create PDP context response, the GTP protocol has to be a modified due to the fact that additional parameters are included. When security protection has been enforced in SGSN, only payload which is secure is allowed to/from the security indicated access point.

In the lower part of the figure is described how the sending of payload to/from UE is affected when one or more security indicated PDP contexts are active, i.e. after security protection has been enforced in SGSN for an access point. If the user equipment wants to send on secure payload (PL) to a security indicated access point, this is blocked already at the user equipment since there actually is no PDP context, as will be realized by an application in the user equipment, in the case a static enforcement mechanism has been implemented.

If on the other hand a dynamic enforcement mechanism is implemented, insecure PL to a security indicated access point will be sent from the user equipment, but it will be blocked in SGSN which is responsible for dropping insecure payload, the PDP contexts still existing. The secure payload in the direction to a security indicated access point will be sent from UE via SGSN and GGSN to the security indicated access point as intended.

On the downlink, from the security indicated access point insecure payload will be blocked at GGSN in case the static enforcement mechanism is implemented. Insecure payload will be blocked at SGSN if a dynamic enforcement mechanism is implemented. The secure payload from a security indicated access point will be forwarded by a GGSN and SGSN to UE. By a security indicated access point is here meant an access point of some equipment to a corporate network. By an access point connection is here meant a tunneling between a user station (e.g. UE) and a GGSN.

FIG. 5B is a sequence diagram similar to that of FIG. 5A, but for the case when the provisioning and distribution of security indications is handled by a DNS. It is here supposed that user equipment UE sends an activate PDP context request to SGSN. SGSN then sends a DNS query (for a domain name) to DNS, which is security indicated and returns a DNS response to SGSN with a predefined IP address which indicates security indication. Enforcement then takes place in SGSN, either in a dynamic way or in a static way. Subsequently SGSN sends a DNS query (domain name with predefined extension) to DNS which returns a DNS response with IP address to the concerned GGSN to SGSN. Thereupon SGSN sends a create PDP context request to that GGSN. Sending of secure and insecure payload respectively after enforcement in SGSN is similar to the situation as described in FIG. 5A.

As an alternative the DNS response (the first or the second) may contain a complete security indication together with the requested GGSN address. If it is done in the first DNS response, the second DNS query and response are not needed.

FIG. 5C is a figure similar to FIGS. 5A, 5B but for the case when the provisioning and distribution of security indications is handled by an HLR. In this case UE sends an attach to SGSN, which sends the message Update Location to HLR. When this is received, HLR, which comprises the security indications, returns the message Insert Subscriber Data including a security indication to SGSN. This is acknowledged to HLR via SGSN, and HLR returns an Update Location Acknowledgement to SGSN. The enforcement takes place in a SGSN in any appropriate manner as discussed above. PDP context activation messageing is then performed between UE and HLR using the GTP protocol. The sequence above between SGSN and HLR uses the MAP (Mobile Application Protocol) protocol which thus is modified in that additional parameters are introduced. GTP is also modified in that additional parameters relating to the security indication are introduced.

The uplink and downlink transfer or sending of payload is allowed/inhibited in a manner similar to that described with reference to FIG. 5A.

Figure 6A:
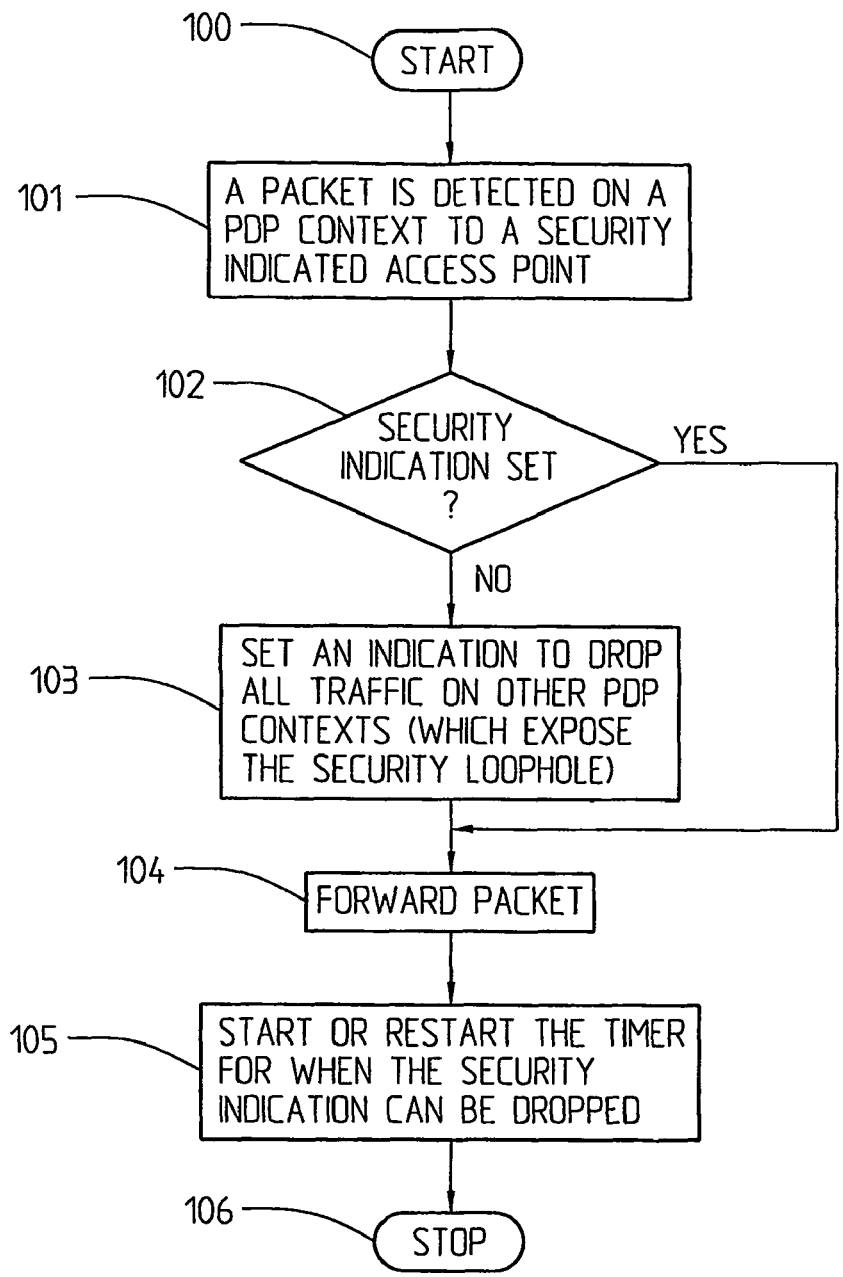
FIG. 6A is a flow diagram illustrating a dynamic enforcement mechanism according to FIG. 3 when a packet is incoming to a security indicated access point.
Figure 6B:
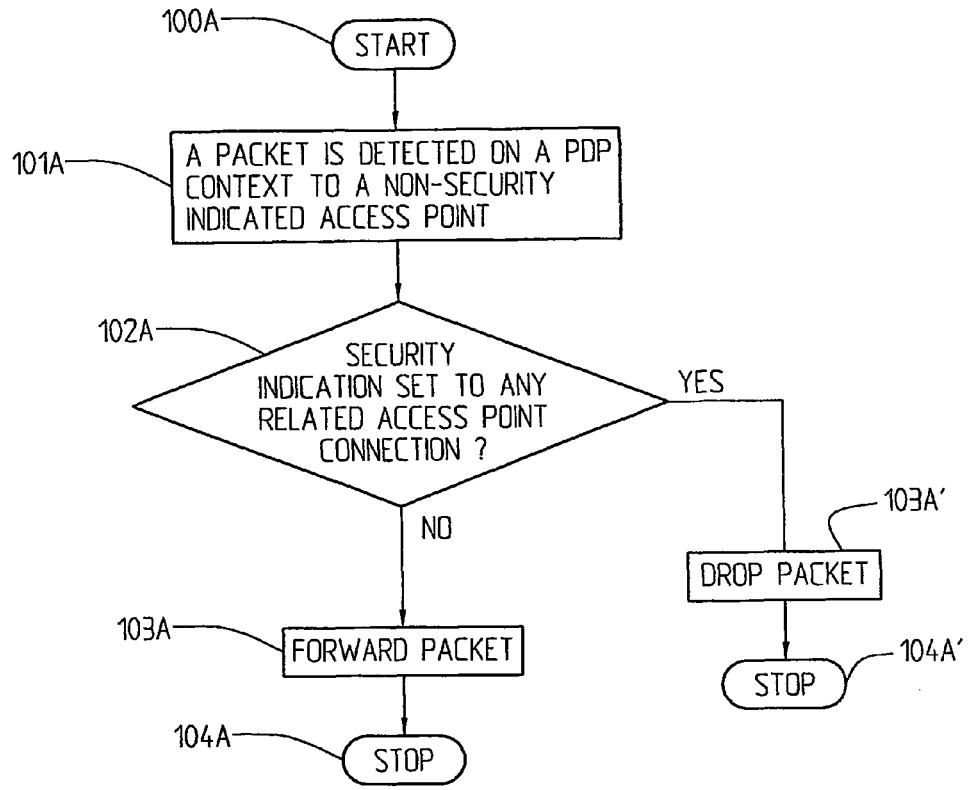
FIG. 6B illustrates, for the dynamic enforcement mechanism of FIG. 6A, when a packet is incoming to an access point which is not security indicated.
Figure 6C:
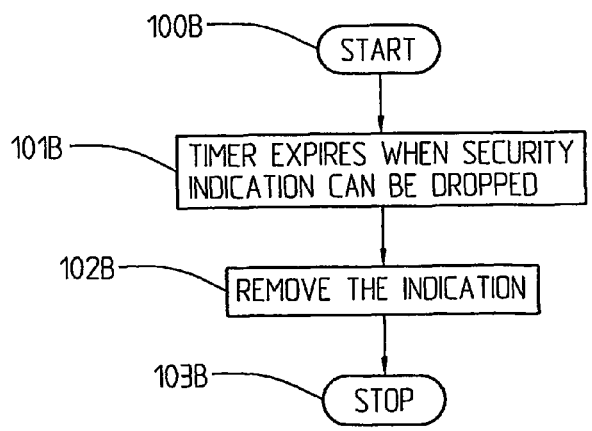
FIG. 6C illustrates the timer controlled removal of a security indication.

FIGS. 6A-6C are flow diagrams schematically describing the procedure with a dynamic security protection enforcement mechanism on packet level.

It is supposed that dynamic security protection is implemented in an SGSN, and that the procedure starts, 100. It is then supposed that a packet is detected on a PDP context to a security indicated access point, 101. Then it is examined if a security indication is already set, 102. If yes, the packet is forwarded, 104. If however no security indication is set, 102, the security indication (e.g. a flag) is set according to which all traffic on other PDP contexts to the security indicated access point (exposing the security loophole) should be dropped, 103. In one implementation this security indication merely relates to all traffic on all other PDP contexts, whereas in other implementations some criteria may be included in the security indication, indicating which PDP contexts to the same security indicated access point are allowed simultaneously etc. However, after the relevant security indication has been set, all traffic that should be dropped is dropped, and the packet on the secure PDP context is forwarded to the security indicated accesses point, 104. A timer is started/restarted to establish when the security indication can be dropped, 105. This can be provided for in different manners, cf. FIG. 6C. The timer is thus started/restarted after each packet. Finally the procedure for that particular packet is finished.

FIG. 6B describes, for the dynamic enforcement, the case when a packet is incoming to an access point which is not security indicated. It should be clear that packets on an allowed PDP context e.g. MMS accept, do not affect the security indication, and they are also not affected thereby themselves.

It is supposed that a packet is detected on a PDP context to an access point which is not security indicated, 101A. An examination is then performed to establish whether a security indication is set to any related access point connection, 102A, if yes, the packet dropped, 103A', and the procedure as far as this "non-secure" packet is concerned is terminated, 104A'. If however, it is established that there is no security indication set to any related access point connection, the packet is forwarded, 103A, and the procedure is ended as far as the particular packet is concerned.

FIG. 6C illustrates the procedure when the timer is started/restarted, 100B, when a secure packet is forwarded. When the timer expires, the security indication can be dropped, 101B. The indication is then removed, 102B, and traffic can again be forwarded on an access point which is not secure, 103B.

Figure 7:
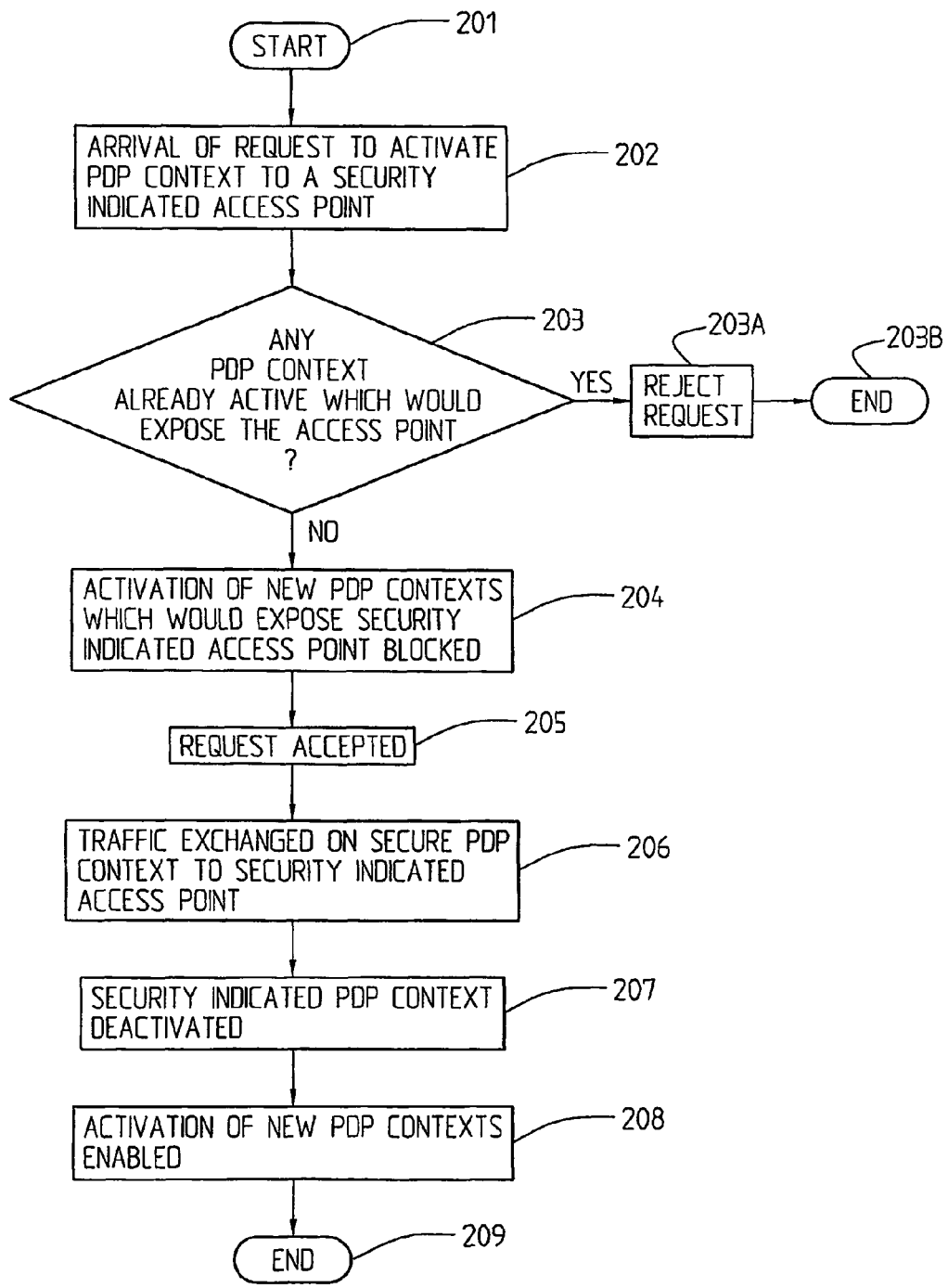
FIG. 7 is a flow diagram describing a first implementation of a static enforcement mechanism.

FIG. 7 is a flow diagram describing a first implementation of a static security enforcement mechanism. The procedure starts, 201, with the arrival of a request to activate a PDP context to a security indicated access point, 202. More generally it relates to the activation of an access point connection comprising a security indicated APN as discussed above. It is then examined if there are any PDP context(s) which is/are already active and which would expose the security indicated access point, 203, or in other terms the security loophole. If yes, the request is rejected, 203A, and the procedure ends, 203B. If, however, there is no PDP context which would interfere with or expose the security indicated access point, activation of new PDP contexts which would expose the security indicated access point is blocked, 204, and then the request is accepted, 205. Traffic is then exchanged on the secure PDP context to the security indicated access point, 206. When all traffical packets of the secure PDP context have been sent, the security indicated PDP context is deactivated, 207, and activation of new PDP context is enabled, 208, whereafter the procedure ends for this PDP context to the security indicated access point, 209. This algorithm particularly requires that the end user himself ensures that no conflicting PDP contexts are active when a new PDP context is requested to the security indicated access point, or APN. However, it could also be possible to implement some automatic detection of conflicting concurrent PDP contexts.

Figure 8:
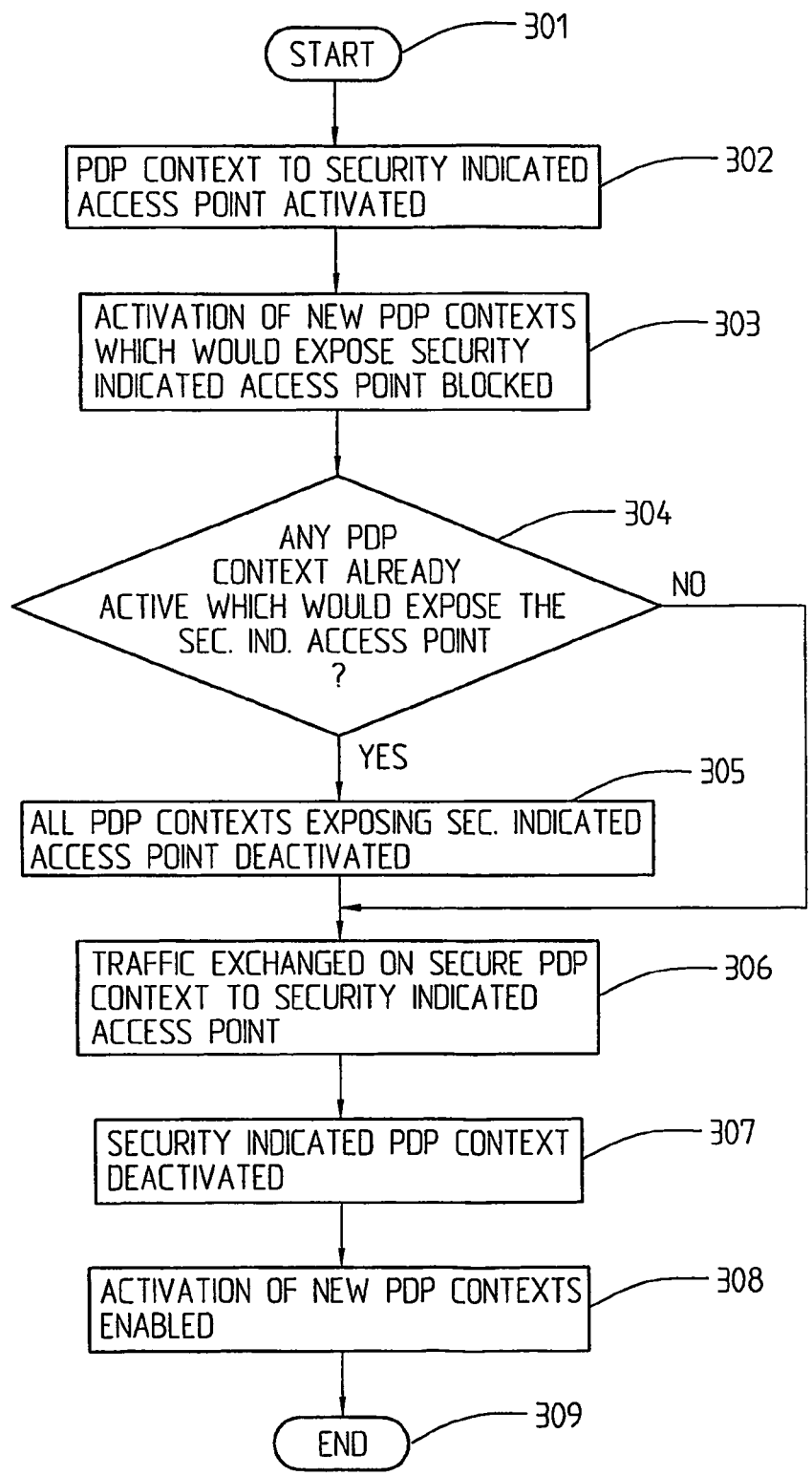
FIG. 8 is a flow diagram describing a second implementation of a static enforcement mechanism.

FIG. 8 shows another implementation of a static enforcement mechanism, the procedure starting, 301, with an activation of a PDP context to a security indicated access point, 302. Activation of new PDP contexts which would expose the security indicated access point are then blocked, 303. After that, as opposed to the embodiment as discussed with reference to FIG. 7, it is examined whether there is/are any PDP context(s) that already is/are active and which would expose the security indicated access point, 304. If yes, all PDP contexts exposing the security indicated access point are deactivated, 305. After that, or if there was no PDP context already active and which would expose the security indicated access point, traffic is exchanged on the secure PDP context to the security indicated access point, 306. When all traffic has been exchanged of the secure PDP context, the security indicated PDP context is deactivated, 307. Subsequently activation of new PDP contexts is enabled, 308, and the procedure ends, 309, for that PDP context incoming to a security indicated access point. In this procedure all conflicting PDP context are deactivated and have to be reactivated, e.g. by the end user, when they are needed again. It should be clear that all concurrent conflicting PDP contexts either means all other PDP contexts than a first PDP context incoming to a security indicated access point, or all other PDP contexts not fulfilling one or more criteria defining which PDP contexts are allowed to be active simultaneously.

Figure 9:
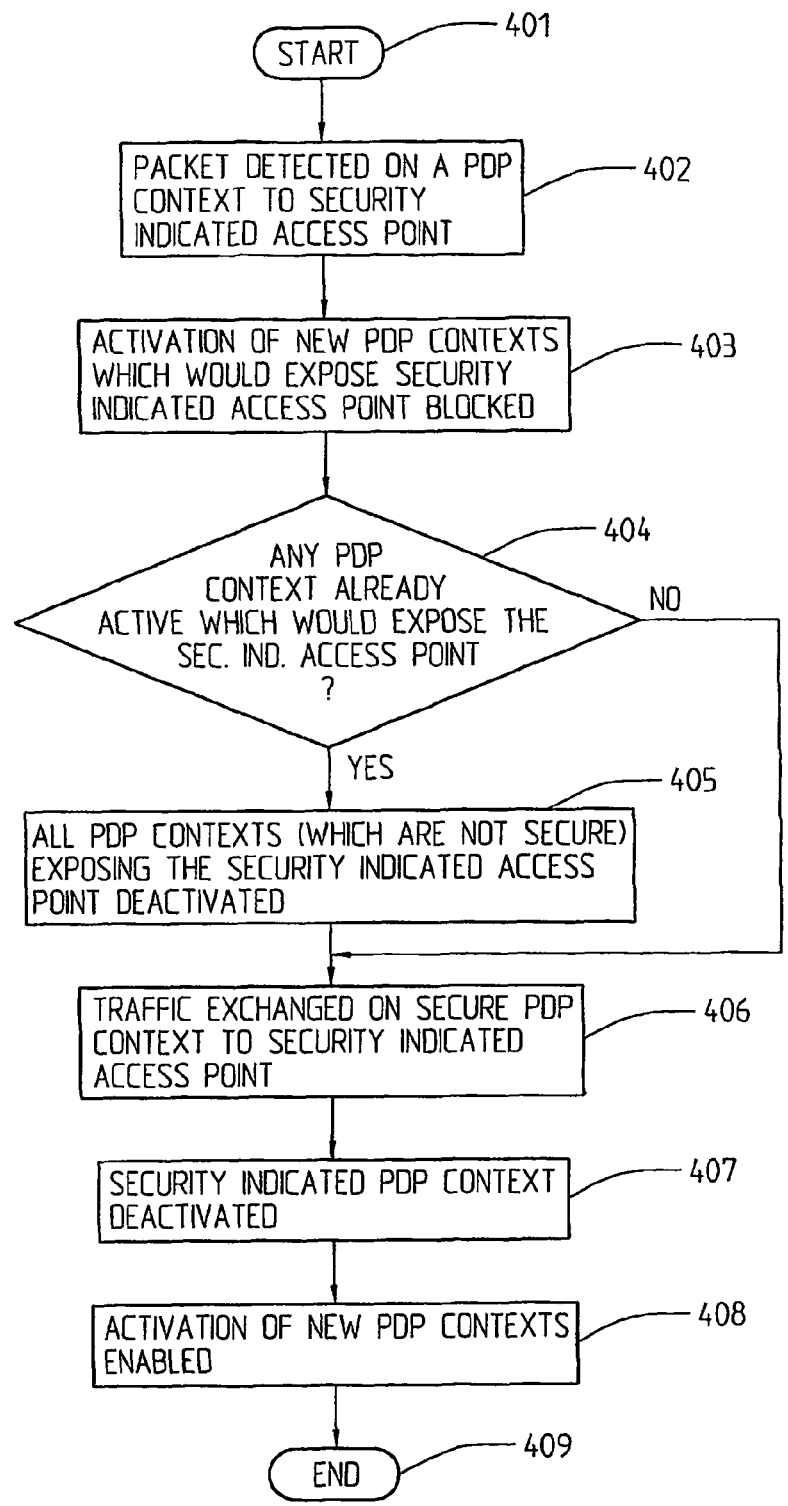
FIG. 9 is a flow diagram describing a third implementation of a static enforcement mechanism.

FIG. 9 shows a third implementation of a static enforcement procedure starting, 401, when a packet is detected on a PDP context to a security indicated access point, 402. Activation of new PDP contexts which would expose the security indicated access point is blocked, 403. Then it is examined if there are any PDP contexts which would expose the security indicated access point which already are active, 404. If yes, all PDP contexts (which are not secure or allowed simultaneously) exposing the security indicated access point are deactivated, 405. Then, and if there was no already active PDP context that might expose the security indicated access point, traffic is exchanged on the secure PDP context to the security indicated access point, 406. When all the traffic on the secure PDP context has been exchanged, the secure PDP context is deactivated, 407, and activation of new PDP contexts is enabled, 408. Thereafter the procedure comes to an end, 409, for the packet detected on a PDP context to a security indicated access point. This algorithm also results in all conflicting PDP contexts being deactivated and having to be reactivated again when needed, e.g. by the end user.

Figure 10:
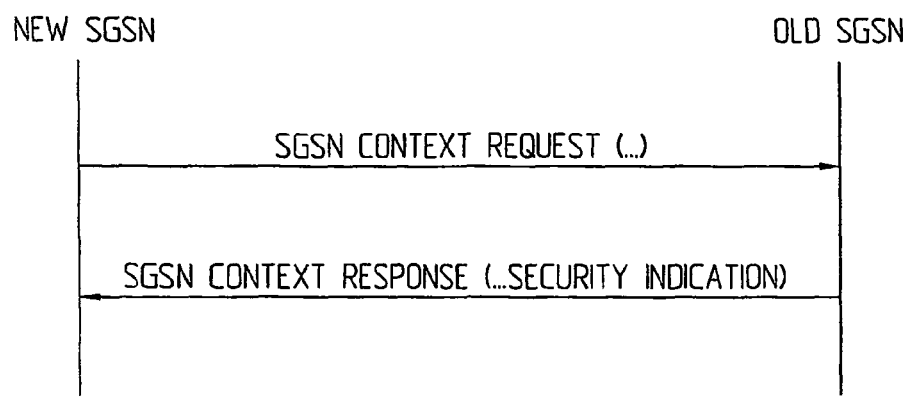
FIG. 10 is a schematical flow diagram illustrating support of mobility management.

FIG. 10 most schematically illustrates the support of mobility when an end user moves from the "coverage" of one SGSN (old SGSN) to another SGSN (new SGSN). When the new SGSN sends a SGSN context request to the old SGSN, the old SGSN responds with a SGSN context response including the security indication as enforced in old SGSN, cf. also FIGS. 2A-2C.

In the application it has been referred to one or more criteria that may be comprised by a security indication for allowing "simultaneous" communication. One example on criteria is given in the document S2-032971, CR on 23.060 as referred to earlier in the application.

In that implementation an APN Restriction is associated to each APN configured at the GGSN. It is used to relate PDP contexts using a certain APN to the type of that APN, such as public access or private corporate APN. It is further used to control the valid combinations of PDP contexts that may be simultaneously active to different APNs.

Then value O is may be allocated to a public-1 type of APN, with a typical end point WAP or MMS, value 1 assigned to a public-2 type of APN with a typical endpoint in Internet or PSPDN (Packet Switched Packet Data Network), value 2 is assigned to a private-1 type of APN with a typical endpoint at a corporate network (e.g. using MMS), whereas value 3 is assigned to a private-2 type of APN with an endpoint in a corporate network not using e.g. MMS. Valid combinations will then be for value 0: values 0, 1, 2; for value 1: values 0, 1; for value 2: value 0; for value 3: none.

Value 3 may e.g. be used by government offices having the highest security requirements or other organizations or firms requiring such a high security.

During the PDP context activation procedure, the APN restriction value for the PDP context being set up may be used by the GGSN to control whether this activation is accepted, based on the most restrictive value of the APN restriction (maximum APN restriction) for the already active PDP contexts, if any, and the APN restriction for this activation. The APN restriction for this PDP context activation shall be transferred to the SGSN for storage.

The APN restriction for each PDP context, if available, shall be transferred from the GGSN to the new SGSN in inter-SGSN routing area updates. The new SGSN shall calculate the maximum APN restriction based on the most restrictive value of the APN restriction (maximum APN restriction) for the already active PDP contexts, if any. If the new SGSN detects that there are PDP contexts to different APNs that violate valid combinations based on the APN restriction, the resultant handling will be network operator dependent.

It should be clear that the invention is not limited to the specifically illustrated embodiments, but that it can be varied in a number of ways within the scope of the appended claims. It is e.g. applicable also for WLAN access. Then SGSN is replaced by a WAG (WLAN Access Gateway) or a PDGN (Packet Data Gateway).

The invention claimed is:

1. A system for enhancing security of end user station access to an Internet and intranet over access network with an access point, comprising:
   a gateway packet data node;
   a packet data support node;
   wherein said gateway packet data node further comprises security indication providing means for providing an security indicated access point with a security criterium indication and for distributing said security criterium indication to said packet data support node;
   wherein said packet data support node further comprises a security enforcement mechanism for preventing all other traffic not fulfilling the security criterium indication associated with said security indicated access point when there is a connection requiring security over the security indicated access point, at least until a last packet of the security indicated access point connection has been sent; and
   wherein the security criterium indication comprises an indication as to the criterium to be fulfilled for concurrent conflicting access point connections in order for the concurrent conflicting access point connections to be allowed simultaneously with a first secure access point connection.

2. A system according to claim 1 wherein the security criterium indication comprises a security marking indicating the access point supports the provision of secure access point connections.

3. A system according to claim 2, wherein the security criterium indication comprises a flag, an attribute or a data structure.

4. A system according to claim 1, wherein the gateway packet data node comprises a Gateway GPRS Support Node (GGSN).

5. A system according to, claim 1 wherein the security indicating and distributing means are provided in a Home Location Register (HLR).

6. A system according to claim 1, wherein the security indicating and distributing means are provided in a Domain Name Server (DNS).

7. A system according to claim 1, wherein the security indicating means are provided in a CGSN comprising the functionality of a GGSN and SGSN.

8. A system according to claim 1, wherein the access point is security indicated through providing an Access Point Name thereof with the security indication.

9. A system according to claim 1, wherein the access point connections comprise Packet Data Protocol (PDP) contexts.

10. A system according to claim 9, wherein the enforcement mechanism is dynamic, and the packet data support node means are provided for dropping all traffic packets of other PDP contexts not meeting the security criterium when a simultaneous PDP context to a security marked access point is used for communication of packets.

11. A system according to claim 10, wherein the packet data node comprises means for detecting traffic on a PDP context to a security indicated access point, and means for activating security protection further comprises means for, after lapse of a predetermined, configurable time period after sending of the last packet on a PDP context with a security indication, allowing traffic on other PDP contexts again.

12. A system according to claim 1, wherein the enforcement mechanism is static and means are provided in a packet data support node for deactivating access point connections which do not meet the security criterium when a security condition is met for one connection to a security indicated access point.

13. A system according to claim 12, wherein the security condition is met when a request is received in the packet data support node relating to activation of a PDP context to a security indicated APN.

14. A system according to claim 12, wherein the security condition is met when a PDP context to a security marked APN has been activated in the packet data support node.

15. A system according to claim 12, wherein the security condition is met when traffic packet is detected on a PDP context to a security indicated access point.

16. A system according to claim 14, wherein the packet data support node comprises means for re-activation of deactivated PDP contexts, and in that said means are end user controlled.

17. A method for enhancing security of end user station access to Internet and intranet, comprising the steps of:
   establishing an access point needs to be secure;
   providing the access point with a security indication with one or more criteria in a network node,
   distributing the security indication to a packet data support node,
   enforcing the security indication by at least preventing all traffic on all access point connections conflicting a first security indicated access point connection through the security indicated access point and not fulfilling the security criteria at least until a last packet of the security indicated access point connection has been sent, and
   wherein the security criterium indication comprises an indication as to the criterium to be fulfilled for concurrent conflicting access point connections in order for the concurrent conflicting access point connections to be allowed simultaneously with a first secure access point connection.

18. A method according to claim 17, wherein the step of distributing comprises the step of:

providing the security indication in a gateway packet data node, in a home location register (HLR) or in a Domain Name Server (DNS).

19. A method according to claim 17, wherein the step of providing a security indication comprises,
providing an Access Point Name (APN) with the security indication.

20. A method according to claim 19, wherein the access point connections comprise PDP contexts.

21. A method according to claim 20, wherein the enforcing step comprises:
dropping all traffic packets of all other PDP contexts than a first incoming security requiring PDP context which do not meet the security criteria.

22. A method according to claim 20, wherein the enforcing step comprises:
deactivating all other conflicting PDP contexts than a first security requiring PDP context, which do not fulfill the security criteria.

* * * * *